(12) United States Patent
Buisson

(10) Patent No.: US 7,893,687 B2
(45) Date of Patent: Feb. 22, 2011

(54) LVDT ACQUISITION DEVICE WITH DUAL DEMODULATION SUBSYSTEM

(75) Inventor: Philippe Buisson, Deuil la Barre (FR)

(73) Assignee: Thales (FR)

( * ) Notice: Subject to any disclaimer, the term of this patent is extended or adjusted under 35 U.S.C. 154(b) by 319 days.

(21) Appl. No.: 12/239,956

(22) Filed: Sep. 29, 2008

(65) Prior Publication Data

US 2009/0086830 A1 Apr. 2, 2009

(30) Foreign Application Priority Data

Sep. 28, 2007 (FR) .................................. 07 06844

(51) Int. Cl.
  *G01B 7/30* (2006.01)
(52) U.S. Cl. .......................... 324/207.18; 340/870.36; 318/657
(58) Field of Classification Search ................
  324/207.15–207.18, 256–258; 340/870.36; 318/657
  See application file for complete search history.

(56) References Cited

U.S. PATENT DOCUMENTS 5,327,030 A    7/1994   DeVito et al.

FOREIGN PATENT DOCUMENTS

EP   1750098 A   2/2007
GB   2132362 A   7/1984
GB   2208440 A   3/1989

*Primary Examiner*—Bot L LeDynh
(74) *Attorney, Agent, or Firm*—Stroock & Stroock & Lavan LLP

(57) ABSTRACT

The invention relates to position sensors of the linearly variable induction difference type. When cost constraints prevent the use of transformers with guaranteed phase-shift tolerance to achieve an accuracy objective, it is advantageous to provide an independent demodulation of the signals of the two windings. The error signal thus has a lower dependence on the phase shift and the accuracy is typically enhanced by a factor greater than an order of magnitude.

9 Claims, 3 Drawing Sheets

US 7,893,687 B2

LVDT ACQUISITION DEVICE WITH DUAL DEMODULATION SUBSYSTEM

FIELD OF THE INVENTION

The present invention applies to the devices and methods for processing signals at the output of position sensors, notably of the linearly variable induction difference type. These sensors are generally designated by their English name Linear Variable Differential Transformer, or LVDT.

BACKGROUND OF THE INVENTION

The sensors of this type normally consist of a transformer comprising a primary circuit to which is supplied an alternating current and two secondary circuits in which a ferromagnetic part in linear motion generates signals, the demodulation of which will enable the measurement of the displacement of the moving part to be acquired. These sensors and their conditioning electronics can have numerous applications: monitoring works of art, monitoring the production of mechanical parts, measuring the level of a liquid in tanks, monitoring the position of vehicle controls, for example a motor vehicle, a ship or an aircraft. The processing of the signal can differ according to the accuracy and the reliability sought for a given application.

One of the main problems is the phase shift that appears between the signals of the two secondaries which affects the accuracy of the measurement when a conventional synchronous demodulation is applied. One of the known responses is to use transformers with guaranteed phase shift tolerance. However this adds significantly to the cost of the LVDTs, which can be prohibitive in the case of acquisition subsystems with several tens of LVDTs which are commonly used in aeronautics.

SUMMARY OF THE INVENTION

The aim of the present invention is to resolve this problem by considerably reducing the inaccuracies resulting from the phase shifting of the secondary windings, and therefore without the use of components with guaranteed tolerance. Although it applies to the processing of signals from any type of LVDT, embodiments of the present invention may be used to monitor aircraft flight controls, for which the prior art requires costly circuits to meet specification requirements.

To this end, the present invention proposes a device for decoding signals at the output of two secondary coils in the axis of which is displaced a ferromagnetic part excited by a primary coil comprising a module for converting said signals from analogue to digital, a module for multiplying the digitized signals by chosen factors, a module for loop-calculating the error on the position of the magnetic part from signals at the output of the multiplication module, wherein said error calculation module comprises two synchronous demodulation channels each applied to one of the error signals specific to one of the secondary coils.

It also proposes a method of using said device.

BRIEF DESCRIPTION OF THE DRAWINGS

The invention will be better understood and its different characteristics and advantages will become apparent from the following description of a number of exemplary embodiments, and its appended figures in which.

DETAILED DESCRIPTION OF THE INVENTION

Figure 1:
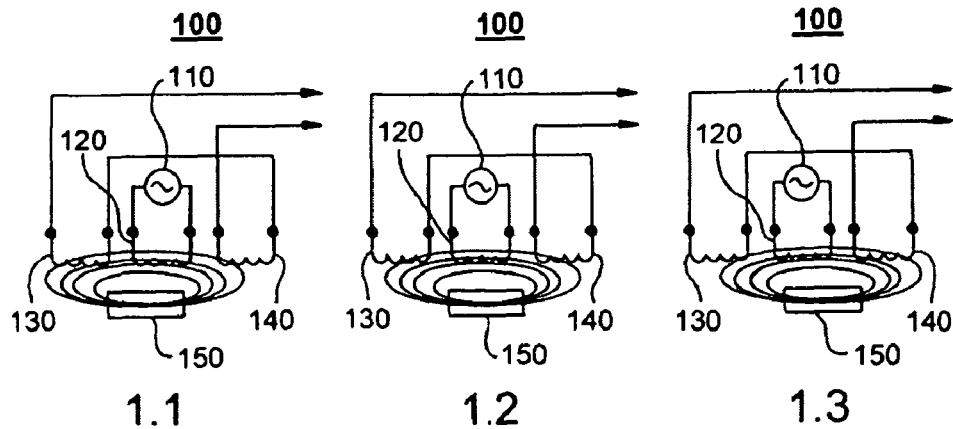
FIG. 1 is a general diagram of an LVDT.

In the three FIGS. 1.1, 1.2 and 1.3, a linear variable differential transformer position sensor 100 is represented in three different positions. It comprises a generator 110 of alternating current feeding a primary winding 120 called excitation signal. A signal is created in the two secondary windings 130 and 140 by the displacement of the ferromagnetic core 150 which is joined to the part for which the displacement is to be measured. In this embodiment, the two windings are mounted in series but in opposition so that it is the difference of the currents in the secondary windings that is measured. In FIG. 1.1, the core is at the maximum of its left travel and the current at the output of the pair of secondaries 130, 140 is equal to the difference of the current at the terminals of the left secondary winding 130 and of the current at the terminals of the right secondary winding 140. In FIG. 1.2, the core is at rest, in a neutral position and the output current from the pair of secondaries 130, 140 is zero. In FIG. 1.3, the core is at the maximum of its right travel and the current at the output of the pair of secondaries 130, 140 is equal to the difference of the current at the terminals of the right secondary winding 140 and of the current at the terminals of the left secondary winding 130. There is a wide variety of LVDTs for measuring travel from a few micrometers to a few tens of centimeters. The travel of the core is bounded so that the variations of the current are proportional to its displacements.

Figure 2:
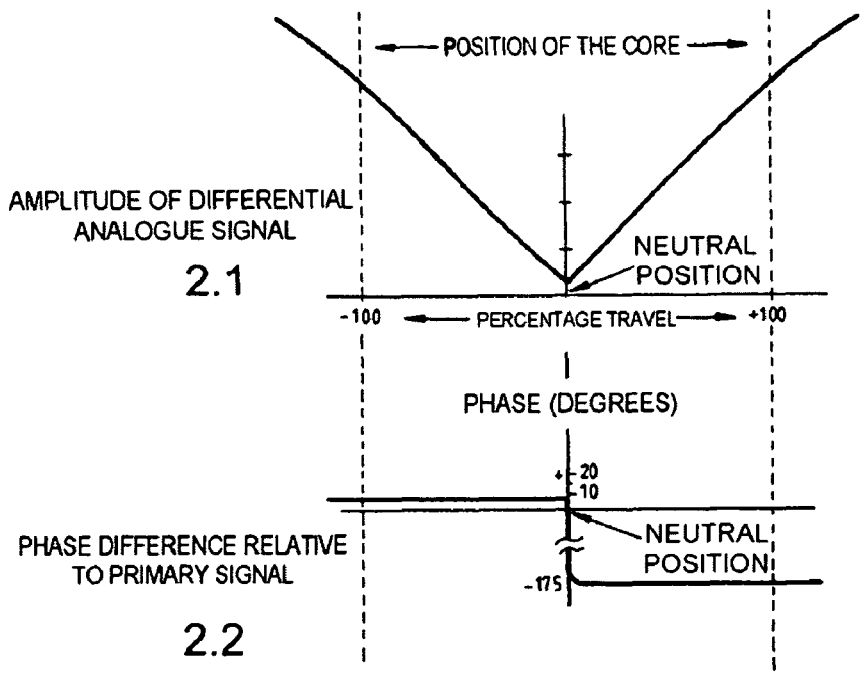
FIG. 2 represents the signal at the output of a device for processing the signals at the output of an LVDT.

FIG. 2 shows the characteristic quantities of the operation of the sensor. FIG. 2.1 represents the variation of the amplitude of the differential analogue signal induced in the secondary circuit by the excitation of the primary winding according to the travel of the core. FIG. 2.2 represents the phase shift of the signal from the secondary circuit relative to the excitation signal, once again according to the travel of the core. The accuracy of the acquisition of the position data by an LVDT therefore depends notably on the excitation frequency of the signal in the primary circuit—which must be chosen to minimize the noise in the measurement subsystem—and the quality of the demodulation of the signal at the output of the sensor.

An accurate synchronous demodulation can be achieved by using a type II locked loop, that is a dual-integration locked loop, the general operating principle of which is explained hereinafter in the description with the following notations:

$X_{in}$: travel of the core of the LVDT at the loop input;

$X_{out}$: travel of the core of the LVDT at the loop output;

V1: voltage of the signal at the output of the secondary winding 130;

V2: voltage of the signal at the output of the secondary winding 140;

$E_0$: peak amplitude of the signals on the secondaries;

$X_0$: maximum value of the travel $X_{in}$ of the core;

f: excitation frequency of the primary winding (also use $\omega=2\pi f$);

Err: travel measurement error;

$\phi_0$: phase shift between V1 and V2.

In the theoretical case of an absence of phase shift, the signals V1 and V2 are expressed:

$$V1=(½)(1+X_{in}/X_0)\cdot E_0\cdot\sin(\omega t)$$

$$V2=(½)(1-X_{in}/X_0)\cdot E_0\cdot\sin(\omega t)$$

Figure 3:
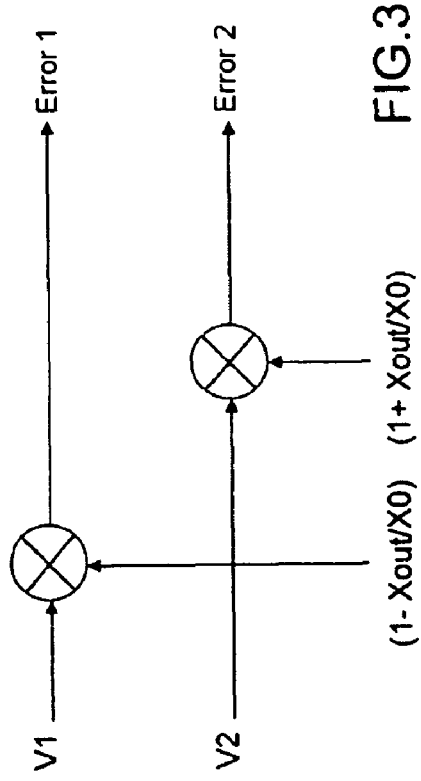
FIG. 3 represents the generation of the error signals on the two channels of a device according to one embodiment of the invention.

V1 and V2 are both digitized by analogue/digital converters (ADC). To allow for the error signal to be calculated easily, as indicated in FIG. 3, they are respectively multiplied by:

$$\lambda_1=1-X_{out}/X_0 \text{ and}$$

$$\lambda_2=1+X_{out}/X_0$$

so as to create two error signals Err1 and Err2 with respective values $\lambda_1$V1 and $\lambda_2$V2. In the prior art, the error signal is created by obtaining the difference between Err1 and Err2. This error signal is then demodulated synchronously by using the excitation signal as a reference.

$$\text{Err}=(½)E_0\cdot\sin(\omega t)\cdot((1+X_{in}/X_0)\cdot(1-X_{out}/X_0)-(1-X_{in}/X_0)\cdot(1+X_{out}/X_0))$$

$$\text{Or Err}=E_0\cdot\sin(\omega t)\cdot(X_{in}/X_0-X_{out}/X_0)$$

Figure 4:
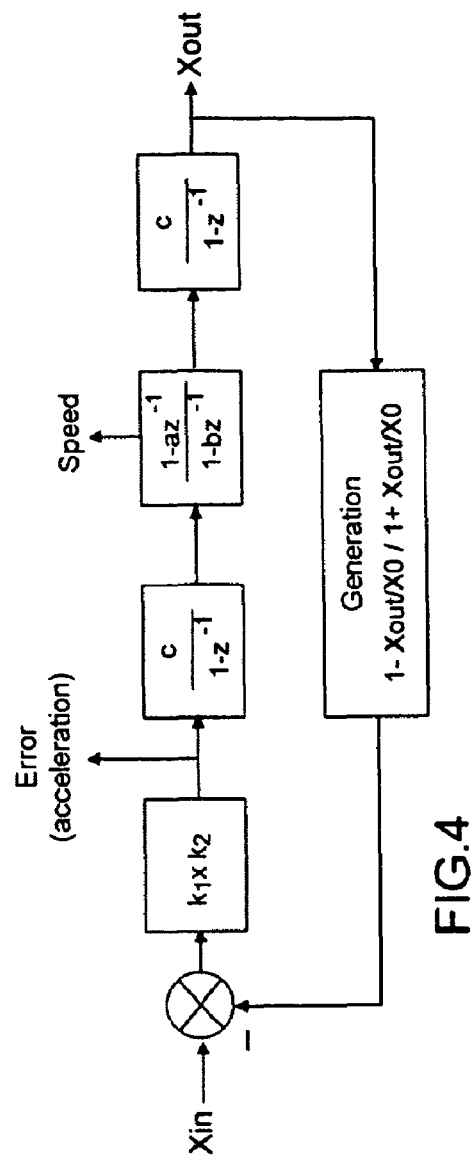
FIG. 4 represents the schematic diagram of a dual integration loop according to one embodiment of the invention.

A demodulation loop is represented in FIG. 4 where the parameters and expressions have the following meanings and, by way of illustration, the following values:

| | |
|---|---|
| Input ADC gain | $k_1 = V_{IN}/V_{REF}$ |
| | $V_{REF}$: ADC reference voltage |
| Gain on error | $k_2 = 18 \times 10^6 \times 2\pi$ |
| Filter zero | a = 4095/4096 |
| Filter pole | b = 4085/4096 |
| Integrator gain | c = 1/4096000 |
| Integrator transfer function | $I(z) = c/(1 - z^{-1})$ |
| Filter transfer function | $C(z) = (1 - az^{-1})/(1 - bz^{-1})$ |
| Open loop transfer function | $G(z) = k_1 \cdot k_2 \cdot I^2(z) \cdot C(z)$ |
| Closed loop transfer function | $H(z) = G(z)/(1 + G(z))$ |

The loop cancels the error signal with the accuracy of the converter. It is designed to follow without error an input position which changes at constant speed.

If there is a phase shift $\phi_0$ of V2 relative to V1, V2 is rewritten:

$$V2=(½)(1-X_{in}/X_0)\cdot E_0\cdot\sin(\omega t+\phi_0)$$

And the expression of the error is as follows:

$$\text{Err}=(½)[E_0\cdot\sin(\omega t)\cdot((1+X_{in}/X_0)\cdot(1-X_{out}/X_0))-E_0\cdot\sin(\omega t+\phi_0)\cdot((1-X_{in}/X_0)\cdot(1+X_{out}/X_0))] \text{ or}$$

$$\text{Err}=E_0\cdot[\sin(\omega t)\cdot[(1-\cos\phi_0)\cdot(1-X_{in}\cdot X_{out}/X_0^2)+(1+\cos\phi_0)\cdot(X_{in}/X_0-X_{out}/X_0)]-\cos(\omega t)\sin\phi_0(1-X_{in}/X_0)\cdot(1+X_{out}/X_0)]$$

After demodulation, the term which is a function of $\cos(\omega t)$ is eliminated because it is in quadrature and we have:

$$\text{Err demod}=KE_0\cdot[(1-\cos\phi_0)\cdot(1-X_{in}\cdot X_{out}/X_0^2)+(1+\cos\phi_0)\cdot(X_{in}/X_0-X_{out}/X_0)]$$

expression in which K is a given factor for a chosen setting of the loop.

The calculation shows that this error is cancelled for $X_{out}$ equal to $X_{in}+\delta X$ with $\delta X/Xo$ equal to:

$$\delta X/Xo=(1-\cos\phi_0)\cdot(1-X_{in}^2/X_0^2)/[(1+\cos\phi_0)+X_{in}/X_0(1-\cos\phi_0)]$$

The error is maximum for $X_{in}$ equal to 0.

In this case $\delta X/Xo=(1-\cos\phi_0)/(1+\cos\phi_0)$

For $\phi_0$ equal to 10°, the error is 0.8% which is prohibitive in view of the required accuracies. One simple but costly solution to this accuracy inadequacy is to use components with phase shifts guaranteed to be less than 3°. The invention makes it possible to use components with more relaxed phase shift tolerances. The principle of the invention is to limit the weighting of the phase shift in the calculation of the error by calculating the latter only after independent demodulation of the two channels.

As illustrated in FIG. 3, two error signals Err1 and Err2 are therefore extracted after multiplying V1 and V2 respectively by $\lambda_1$ and $\lambda_2$.

Figure 5:
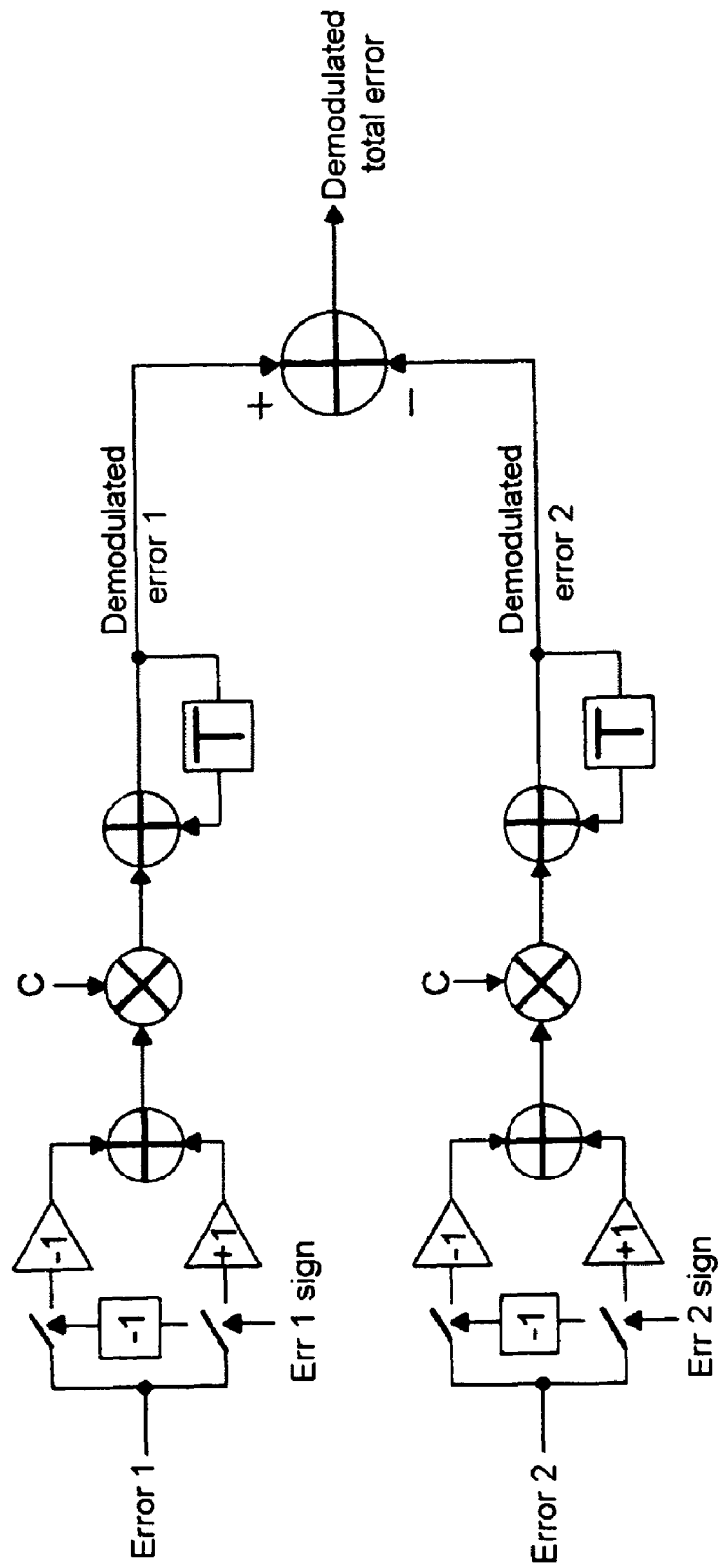
FIG. 5 represents the schematic diagram of the generation of the error signals on the two demodulation channels according to the invention.

As illustrated in FIG. 5, these two error signals Err1 and Err2 are then demodulated by two independent channels, the dual integration loop being of the same type as that illustrated in FIG. 4, the operation of which has already been described hereinabove. The overall error is then calculated by the difference of the two channels, as illustrated on the right of FIG. 5. This independent calculation of the errors is possible in the case of the LVDT because, by definition, $|X_{in}|$ and $|X_{out}|$ are always less than $|X_0|$. Therefore $\lambda_1$ and $\lambda_2$ are always positive, Err1 has the same sign as $\sin(\omega t)$ and Err2 the same sign as $\sin(\omega t+\phi_0)$. The demodulation therefore consists in multiplying Err1 by +1 when Err1 is positive and by −1 when it is negative. Similarly, Err2 is multiplied by +1 when Err2 is positive and by −1 when it is negative. The difference of the two rectified errors is then obtained and integrated.

In this way, the errors due to the phase shifts between primary and secondary and between secondaries imparted by the sensor are in principle cancelled. In effect, the two full-wave rectifications eliminate on the one hand the term which is a function of $\sin(\omega t)$ of Err1 and on the other hand the term which is a function of $\sin(\omega t+\phi_0)$ of Err2. The expression of the total demodulated error therefore takes the form:

$$\text{Err demod}=K'((X_{in}/X_0-X_{out}/X_0)$$

When the loop converges ($X_{out}=X_{in}$), the error is therefore cancelled.

Simulations have been carried out for different phase-shift values with a simple demodulation after error calculation (Case 1) and with dual demodulation of the errors (Case 2). The residual errors obtained in these simulations are given in the table below and fully confirm the advantage provided by the invention since, in the intermediate case, the gain in accuracy is by a factor of 18.

| Phase shift | Accuracy (Case 1) | Accuracy (Case 2) |
|---|---|---|
| 3° | 0.11% | 0.02% |
| 10° | 0.9% | 0.05% |
| 20° | 3.4% | 0.1% |

The duplication of the demodulation subsystem only very slightly increases the resources needed in a programmable circuit or an ASIC for a very significant benefit on performance in the presence of significant phase shift between the two inputs.

The invention claimed is:

1. A device for decoding signals at the output of a linear variable differential transformer (LVDT), the LVDT comprising: a primary coil; a first secondary coil arranged coaxially at a first end of the primary coil; a second secondary coil arranged coaxially at a second end of the primary coil; and a slidable ferromagnetic part excited by the primary coil, the device comprising:
   an analog to digital converter connected to both an output of the first secondary coil and to an output of the second secondary coil, producing first and second digitized outputs;
   a multiplier module, multiplying the first and second digitized outputs respectively by first and second predetermined factors respectively, producing first and second multiplied outputs;
   an error calculation module for calculating a position error of the ferromagnetic part, using the first and second multiplied outputs, the error calculation module comprising: a first synchronous demodulation channel applied to the first multiplied output; and a second synchronous demodulation channel applied to the second multiplied output.

2. The device of claim 1, wherein the first predetermined factor ($\lambda 1$) and the second predetermined factor ($\lambda 2$) are established in accordance with the following relationship:

$$\lambda 1 = (X\text{out})/(X0) - 1,$$

$$\lambda 2 = (X\text{out})/(X0) + 1, \text{ wherein:}$$

(Xout) is a measured value of a position of the ferromagnetic part at the output of the error calculation loop; and
(X0) is a value of a maximum travel of the ferromagnetic part.

3. The device of claim 1, wherein the first and second synchronous demodulation channels each comprise a dual-integration locked loop.

4. The device of claim 3, further comprising a rectifier configured to provide a rectification of the first and second synchronous demodulation channels in each channel by multiplying positive and negative half-waves of a signal in each respective synchronous demodulation channel by a sign of an error of each respective synchronous demodulation channel.

5. A method for decoding first and second signals at the output of a linear variable differential transformer (LVDT), the LVDT comprising: a primary coil; a first secondary coil arranged coaxially at a first end of the primary coil, providing a first signal; a second secondary coil arranged coaxially at a second end of the primary coil, providing a second signal; and a slidable ferromagnetic part excited by the primary coil, the method comprising:
   converting the respective first and second signals from analog to digital, producing first and second digitized signals;
   multiplying the first and second digitized signals respectively by first and second predetermined factors respectively, producing first and second multiplied outputs; and
   loop-calculating the error of the position of the ferromagnetic part from the first and second multiplied outputs, by the application of a first synchronous demodulation channel to an error signal specific to the first secondary coils, and the application of a second synchronous demodulation channel to an error signal specific to the second secondary coils.

6. The method of claim 5, wherein the first predetermined factor ($\lambda 1$) and the second predetermined factor ($\lambda 2$) are established in accordance with the following relationship:

$$\lambda 1 = (X\text{out})/(X0) - 1,$$

$$\lambda 2 = (X\text{out})/(X0) + 1, \text{ wherein:}$$

(Xout) is a measured value of a position of the ferromagnetic part at the output of the error calculation loop; and
(X0) is a value of a maximum travel of the ferromagnetic part.

7. The method of claim 6, wherein the first and second synchronous demodulation channels comprise a first and second dual integration locked loop, respectively.

8. The method claim 7, further comprising the step of multiplying positive and negative half-waves of the signal of the first and second synchronous demodulation channels by the sign of the error of the first and second synchronous demodulation channel respectively, producing rectified demodulation channels.

9. The method of claim 5, wherein the decoded first and second signals indicate the position of the slidable ferromagnetic part.

* * * * *